Nov. 18, 1969 C. C. FOSTER 3,479,652
PARALLEL INPUT MECHANISM FOR MEMORY UNIT
Filed June 27, 1966

INVENTOR
CAXTON C. FOSTER
BY: [signature]
ATTORNEY

United States Patent Office 3,479,652

Patented Nov. 18, 1969

3,479,652

PARALLEL INPUT MECHANISM FOR MEMORY UNIT

Caxton C. Foster, 100 Heatherstone Road, Amherst, Mass. 01003

Filed June 27, 1966, Ser. No. 565,337

Int. Cl. G11b 7/00

U.S. Cl. 340—173 6 Claims

ABSTRACT OF THE DISCLOSURE

The invention relates to a parallel input mechanism for a memory unit which comprises a technique to achieve fast loading of an associative memory storage bank. An array of light sensitive elements equal in number to the number of words in the memory storage bank are electrically connected to each core of a respective word with which they are associated. A film strip is backlighted and includes information contained thereon as opaque or clear portions thereof so that the backlighting illuminates the light sensitive elements to transfer the information in parallel to respective common bits of every word in the memory storage bank. The backlighting is provided by a CRT scan so as to accurately backlight only selected areas of the film strip so that the proper information is transferred into the memory storage bank, and so that great quantities of information can be stored on a single film strip and transfer of the information into the storage bank can be accomplished without movement of the film strip, but by the proper control of the light emanating from the CRT face.

This invention relates to a parallel input mechanism for a memory unit to substantially decrease the amount of time required to load a memory unit.

In many problems the size of the data base far exceeds the size of the core or memory storage unit available. This then requires the use of a backing store usually with slow transfer rates. Usually these backing stores have been stored on tape, and the transfer rate of the information from the tape into the storage element always takes a considerable amount of time. Other transferring mechanism such as discs would also require rather lengthy periods of time for a transfer. Efforts to make the loading into a memory unit in parallel can greatly speed up these transfer rates to keep pace with the rapidly developing technology in computers and associative memory storage units today.

Therefore it is the general object of the present invention to overcome the slow transfer rates of the prior art, by developing a parallel loading mechanism for an associative memory storage unit, where very large quantities of information are instantly available and can be loaded into the memory unit in an extremely short period of time with very little difficulty, and where such mechanism is relatively simple and inexpensive.

A further object of the invention is to provide an optical method for parallel loading an associative memory storage unit which is extremely fast and efficient, and wherein very large amounts of information may be stored on film and transferred at very high rates to storage in the storage unit.

The aforesaid objects of the invention and other objects which will become apparent as the description proceeds are achieved by providing in a parallel information input mechanism for a memory storage unit comprising a plurality of individual memory cores arranged to store bits of information representing words, where word lengths are equal and the cores of respective words are bit aligned, the combination of an array of light sensitive elements equal in number to the number of words in the memory storage unit, said elements being electrically connected to each core in a respective word with which they are associated, means to simultaneously subject the array to an optical signal having predetermined information represented as oriented light and dark areas where each area covers a respective individual element, whereby those areas which are lighted actuate their respective elements causing a current pulse to be transmitted to the cores in the word in memory to which the element is aligned, shifter means to select which bit in each word will be set upon a pulse from its respective element, means to subsequently subject the array to other optical signals of a total number equal to the number of bits in each word, and means to coordinate shifting the shifter means to subsequent aligned bits of each word at the same time as each subsequent optical signal is applied whereby when the last optical signal is applied, every core in the memory storage unit has been set in accordance with the predetermined information of the optical signals.

For a better understanding of the invention, reference should be had to the accompanying drawings wherein.

Figure 2:
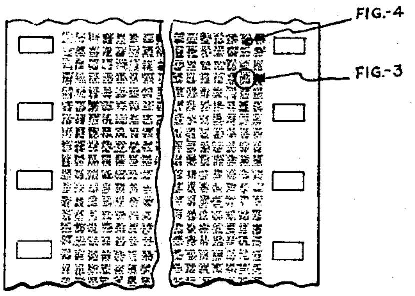
FIG. 2 is a greatly enlarged broken away plan view of the film utilized for storing the information.
Figure 3:
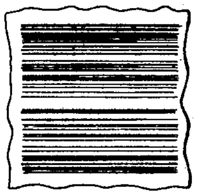
Figure 4:
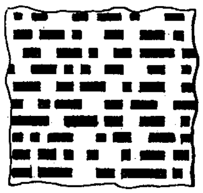

FIG. 3 is a very greatly enlarged broken away illustration of a portion of one small square section of the film strip of FIG. 2, illustrating one method for storing information on the film strip; and FIG. 4 is a greatly enlarged broken away illustration of a portion of one square of the film strip of FIG. 2 showing another method for storing more information on the film than is illustrated in FIG. 3.

Figure 1:
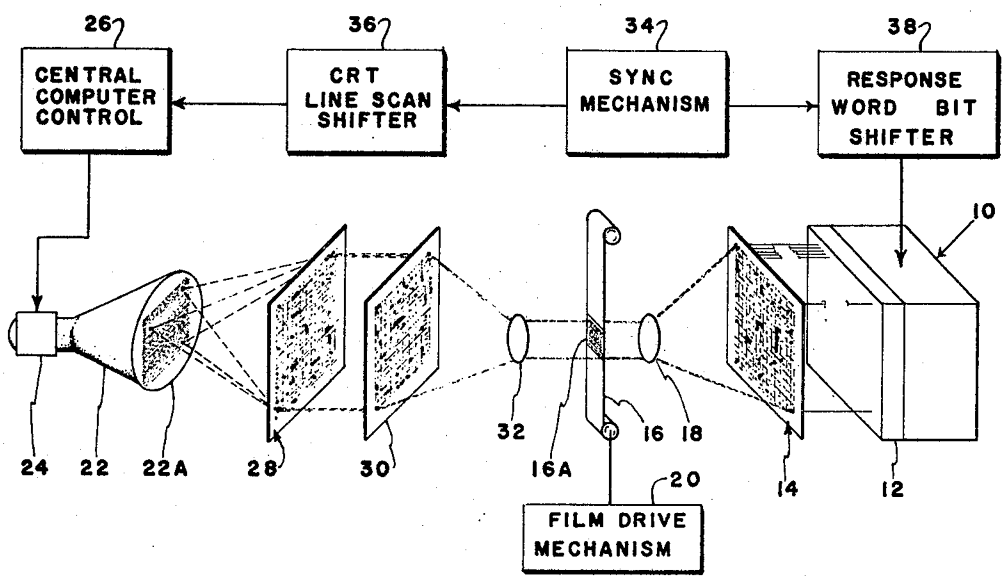
FIG. 1 is a schematic block diagram illustration of a preferred embodiment of the invention.

With reference to the form of the invention illustrated in FIG. 1 of the drawings, the numeral 10 indicates generally a memory storage unit particularly adapted for associative memory, where the words are all bit aligned and of the same word length with appropriate wiring for associative memory operation. The exact construction of such a unit is more particularly shown in Patent No. 3,300,761 also assigned to Goodyear Aerospace Corporation. In order to set or apply information in parallel into the storage unit 10, each word has associated therewith a specific response solid state device or flip-flop, and these are designated by a response flip-flop section 12. For the purpose of simplifying the discussion hereinafter, let us assume that the memory storage unit 10 is adapted for storing 4096 words, and the words are arranged in a square grid 64 x 64 on each side. This means that the response flip-flop section 12 is also arranged in a square 64 x 64 grid with each respective flip-flop associated with a respective word in the unit 10.

In order to provide an input to each flip-flop in the array 12, the invention contemplates use of a high speed photo diode array, indicated generally by the numeral 14. These photodiodes may be of any convenient size, but for the purposes of the invention with a 64 x 64 grid array, it is thought that diodes approximately .2 inch in diameter will give an array size of just over 1 sq. ft. Photo diodes of this scale having fast response and sufficient output current to be practical are readily available today. For example, the Hewlett-Packard Corporation, located at Palo Alto, Calif. makes photo diodes of these particular characteristics, as do many other electronic companies in business today. With the high response of the photo diode array 14, it then becomes a matter of passing information to the photo diode array 14 in the form of an optical signal, so that each photo diode in the array may be appropriately set simultaneously to either see light or dark depending upon what information it is desired to set into the particular core in the memory storage unit 10 to which the respective diode is associated at that particular time.

Thus, supposing, for example, that light spots indicated "ones" and dark spots indicated "zeros," the invention contemplates that a film strip 16 having appropriate light and dark spots thereon may be backlighted and projected through a suitable lens 18 onto the entire surface of the photodiode array 14. One very simple system would be to have each frame, as indicated by the frame 16A of the film strip 16, predetermined and previously arranged with light and dark spots representing the desired information of each respective bit of the same bit in each word in memory. Then, for each successive bit, the film strip 16 could be driven to another frame 16A, by an appropriate film drive mechanism 20, to then set the next bit fully into the storage unit 10. However, this particular type system would be limited by the mechanical drive of the film strip 16, and necessitate shifting the film strip for setting each successive bit. Therefore, if the word length were 50 bits, it would require 50 frames, and an appropriate internal program of an entire core load of 4096 words of 50 bits could be entered in a time period limited only by the film shifting speed.

However, while the actual mechanism described hereinafter is not quite as simple as a movie projector operation described above, it does offer greater densities and higher speeds. The mechanism specifically includes a cathode ray tube 22 having an appropriate deflection yoke 24 and driven from a central computer control 26. The tube 22 may be a standard five or ten inch tube, and for the purposes of this invention should be set to scan 50 horizontal lines as its raster. The particular line and the particular place on the line scanned by the tube 22 is controlled in the usual manner by a deflection yoke 24 with an appropriate "address" signal from central computer control 26. This "address" signal is similar to all address requirements used in associative memories, and for example may comprise a suitable six digit signal introduced into the computer control 26 either manually or automatically to provide an analog voltage to either the vertical or horizontal deflection plates, or both of the yoke 24.

The light emitted by the electron beam impinging on the face 22A of the tube 22 is received by a 64 x 64 array of small optical lenses, indicated as an array by the numeral 28. It should be understood that the light emitted from the face 22A corresponds to the backlighting described above, except it provides a technique to control and define the area or point of backlighting. Each of the lenses in the array 28 is designed to project a full image of the face 22A onto an image plane 30. Thus, there will be 4096 completely reduced size images of the face 22A on the plane 30, all oriented in a 64 x 64 array as determined by the array of lenses 28. Actually, the image plane 30 is made of a suitable material which will pass the images projected on one side through to the other so that they may be picked up and used. Any type of material achieving this object will be suitable. There are many double sided viewing movie screens, for example, which might suitably be used for the purposes of the image plane 30.

The image from the plane 30 of all 4096 separate images of CRT face 22A is reduced by a lens 32 and projected onto the frame 16A of film strip 16. In this instance, however, the film strip 16 and particularly the frame 16A will be of different characteristics than for the motion picture type embodiment defined above. The specific configuration of the film strip 16 will be defined more fully with reference to FIGS. 2 through 4.

In any event, the particular configurations of the frame 16A, as defined hereinafter, when illuminated by the image from the plane 30 allows the projection thereof onto the diode array 14 through the lens 18 so that the diodes in array 14 are appropriately energized as selectively desired by the information previously prepared onto the frame 16A.

The frame 16A for the purposes of the 64 x 64 array defined hereinabove, is contemplated by the invention to be about one inch by one inch. On this frame there are 4096 squares each containing 50 horizontal lines of substantially the same relative spacing as the face 22A of the cathode ray tube 22. Each line may be either opaque or clear, as indicated in FIG. 3. As an alternative, each of the 50 lines may be a sequence of 50 clear or opaque spaces, as indicated in FIG. 4. With the one inch square frame 16A divided into 4096 sub-divided squares with 50 lines in each square, it means that each frame 16A can provide a complete load to the memory storage unit 16 if word length is 50 bits. If the frame 16A is made up as indicated in FIG. 4, it means that each frame could load 50 memory storage units 10 having word lengths of 50 bits. In other words, the configuration of FIG. 4 gives a total word storage of over 200,000 words without moving the film strip 16 at all. The resolution requirements for this one inch square space is no more than 50 x 64 or 3200 lines per inch, and some of the modern films, even verichrome films which may be brought in the drugstore, can easily meet this resolution, and some microfilms can in fact reach to resolutions of 25,000 to 40,000 lines per inch.

In the embodiment of FIG. 3, if each line of the 50 lines of the tube 22 is scanned in, for example, one microsecond, with shifting to each subsequent line on one microsecond intervals, the entire memory storage unit 10 can be loaded in 50 microseconds. The film strip 16 could then be advanced to the next frame for loading subsequent word information into the storage unit. If the film strip is made up as indicated in the embodiment of FIG. 4, the scanning of each line on the cathode ray tube raster will be point by point on perhaps one microsecond intervals to 50 spaced points on the line to thereby individually scan each predetermined opaque or clear portion of only one line of the 50 lines in each square. Again, this means that the entire memory storage unit 10 can be loaded in about 50 microseconds. In this instance, however, one merely needs to change the line scanned of the cathode ray tube 22 to thereby allow another full loading of the storage unit 10. No movement of film strip 16 need be effected until or unless other word loading information is desired which is not stored on one of the 50 lines of each square. Of course, other variations in the size or spacing or word requirements could easily be achieved by varying the numbers and dimensions set forth above.

It should now clearly be understood that the array of lenses 28 acts to direct one complete image of the cathode ray tube over each of the 4096 squares on the film strip frame **16*a*. Since each of the images is identical, it means that the same area on each square of the frame is being illuminated with the beam from the cathode ray tube. Naturally, each square of the film strip frame 16A is focused by the lens 18** onto its respectively aligned diode, and light is only detected by the respective diodes when a clear area on each square is exposed by the particular position of the electron beam of the cathode ray tube.

Preparation of the film strip 16 is not a problem. The preparation can be accomplished without time requirements, and very careful planning and preparation for the manufacture of this strip is certainly advisable. For example, large art layouts similar to that shown in enlarged FIG. 4 could be photographically made, and reduced in size while still having sufficient resolution because of the resolution capabilities of film as pointed out above being easily sufficient to meet the requirements of the invention.

Also, the film strips could be prepared by having each response flip-flop in the array 12 drive a small light such as a "pin light" made by the Pinlites, Inc., 1275–T Bloomfield Ave., Fairfield, N.J., 07006. These pin lights are quite small, low powered, and will respond at rates up to about 200 cycles per second. Therefore, if each response flip-flop has a pin light which glows if it is set, and if an image of the 64 x 64 array is projected by suitable optics to expose a short line or small area in proper position on an unexposed film strip, with a bit rate of about 10 milliseconds, only about ½ second is required to deposit 4096 words of 50 bits each. This preparation technique may be entirely compatible with the prior art tape and disc techniques mentioned above. The pin lights must have a separation from each other for proper exposure and resolution of the unexposed film strip. This means that such a grid array is rather large for a 4096 word memory, but this is not outside practical considerations. Another suitable apparatus instead of the pin lights might be a GaAs light emissive diode with a response time well under one microsecond. These lights are made by the Texas Instruments Incorporated, Dallas, Tex.

It should be understood that there must be suitable synchronism between the shifting of the beam on the face 22A of the cathode ray tube 22 and the actual bit alignment which will be set in the memory storage unit 10. To this end, the invention contemplates that a suitable synchronizing mechanism 34 will coordinate drive to a CRT line scan shifter 36 and a response word bit shifter 38 to insure that central computer control 26 and the memory storage unit 10 will be properly set to sequentially write the proper information into the proper bits of each word in the storage unit 10. For example, in practice, the beam of the cathode ray tube will start at the far righthand side of the top line on the face 22A and this will represent the least significant bit of each word in the storage unit 10. When the first bit has been scanned and written, in approximately one microsecond, the beam will shift upon proper signal from the synchronizing mechanism 34 to the next bit and at the same time the response word bit shifter 38 will shift the write pulse to the next significant bit of each word in the memory unit 10. This sequence will be followed for each of the next 48 bits or whatever the particular word length is until the most significant bit has been written, and then, of course, the loading process is completed.

Thus, it is seen that a parallel loading of a memory storage unit is accomplished with an optical input signal to very rapidly, accurately, and efficiently load a memory storage unit in a very short period of time, and where great amounts of information can be carried optically with ease in shifting from one set of loading information to another. Various arrangements for the film strip can be utilized to provide the desired optical signal, and other means to cause the projection of the optical signal from a previously prepared film strip onto the photo diode array certainly are possible. A dichloric filter might be used instead of the cathode ray tube 22 to get more intensity, with such filters set up in combination to get proper vertical and horizontal responses. Suitable optical tunnels or other optical beam splitting mechanism might be used in place of the lens array 28 so as to achieve the desired number of images for proper projection of the information stored on the film strip 16.

While in accordance with the patent statutes, only one best known embodiment of the invention has been illustrated and described in detail, it is to be particularly understood that the invention is not limited thereto or thereby, but that the inventive scope is defined in the appended claims.

What is claimed is:

1. In a parallel information input mechanism for a memory storage unit comprising a plurality of individual memory cores arranged to store bits of information representing words, where word lengths are equal and the cores of respective words are bit aligned, the combination of an array of photodiodes equal in number to the number of words in the memory storage unit, said diodes being associated in series with each core of a respective word, means to simultaneously subject the array to an optical signal having predetermined information represented as oriented light and dark areas where each area covers a respective individual diode, whereby those areas which are lighted actuate their respective diodes causing a current pulse to be transmitted to the cores in the word memory to which the diode is aligned, shifter means to select which bit in each word will be set upon a current pulse from its respective diode, means to subsequently sequentially subject the array to other optical signals of a total number equal to the number of bits in each word, and means to coordinate shifting the shifter means to subsequent aligned bits of each word at the same time as each subsequent optical signal is sequentially applied whereby when the last optical signal is applied every core in the memory storage unit is set in accordance with the predetermined information of the optical signals.

2. A mechanism according to claim 1 where the optical signal is stored on film which film is backlighted over selected areas thereof to project the optical information onto the array of light sensitive elements.

3. A mechanism according to claim 2 where the backlighting is accomplished by a cathode ray tube wherein the position of the beam on the face of the cathode ray tube determines what selected areas of the film are backlighted, and includes means to selectively project one or more images of the face of the cathode ray tube as back-lighting onto selected areas of the film.

4. A mechanism according to claim 2 where the back-lighted film contains a number of squares equal to the number of words in the memory storage unit, and each square has a plurality of light or dark areas representing bits of information such as are equal in number to at least the number of bits in each word in the memory storage unit.

5. A mechanism according to claim 1 where an input solid state device is associated between each light sensitive element and its respective word in the memory storage unit whereby current signals from the light sensitive elements set the respective solid state device which in turn sets a respective core in the particular word in the memory storage unit with which it is associated.

6. A parallel information input mechanism for a memory storage unit, which comprises a photo diode array arranged as a grid where the number of diodes corresponds to the number of words in the memory storage unit and each diode is associated with a respective word, a film strip containing information in the form of opaque and clear areas, means to project a predetermined optical pattern to backlight selected portions of the film strip for projection onto the photo diode array which represents desired loading bit information for the same bit of each word in the memory storage unit, means to determine and coordinate with the selected backlighting of the film strip which bit of each word in the memory storage unit will receive the bit information from the diode aray, means to subsequently selectively coordinate the backlighting of the film strip to predetermined areas a total number of times equal to the number of bits in each word, and means to sequentially change the means determining which bit in each word is set whereby each bit of each word is set with a specific optical pattern projected onto the diode array by the sequential predetermined change in the backlighting of the film strip.

References Cited

UNITED STATES PATENTS

| | | | |
|---|---|---|---|
| 3,072,889 | 1/1963 | Willcox | 340—173 |
| 3,191,157 | 6/1965 | Parker | 340—173 |
| 3,215,989 | 11/1965 | Ketchledge | 340—173 |
| 3,371,324 | 2/1968 | Sinoto | 340—173 |

TERRELL W. FEARS, Primary Examiner

U.S. Cl. X.R.

250—219; 340—174